April 7, 1931.  R. R. WATERMAN  1,799,834
UNION
Filed June 15, 1926

INVENTOR.
Russell R. Waterman
BY
A. B. Bowman
ATTORNEY.

Patented Apr. 7, 1931

1,799,834

UNITED STATES PATENT OFFICE

RUSSELL R. WATERMAN, OF LONG BEACH, CALIFORNIA, ASSIGNOR TO FARMERS' NATIONAL BANK OF GREENVILLE, OHIO, OF GREENVILLE, OHIO, A CORPORATION OF OHIO, TRUSTEE

UNION

Application filed June 15, 1926. Serial No. 116,105.

My invention relates to a union for connecting two pieces of tubing or pipe and particularly adapted for use where there is high and varying temperatures and high pressure.

The principal objects of my invention are: first, to provide a union of this class in which the packing gland effectually seals at all temperatures and pressures; second, to provide a union of this class with a novel packing gland; third, to provide a union of this class which is leak proof; fourth, to provide a union of this class which may be tightened, loosened, disassembled and assembled without destroying its efficiency; and, fifth, to provide a union of this class which is very simple and economical of construction, easy to install and remove, efficient in its action and which will not readily deteriorate or get out of order.

Figure 1:
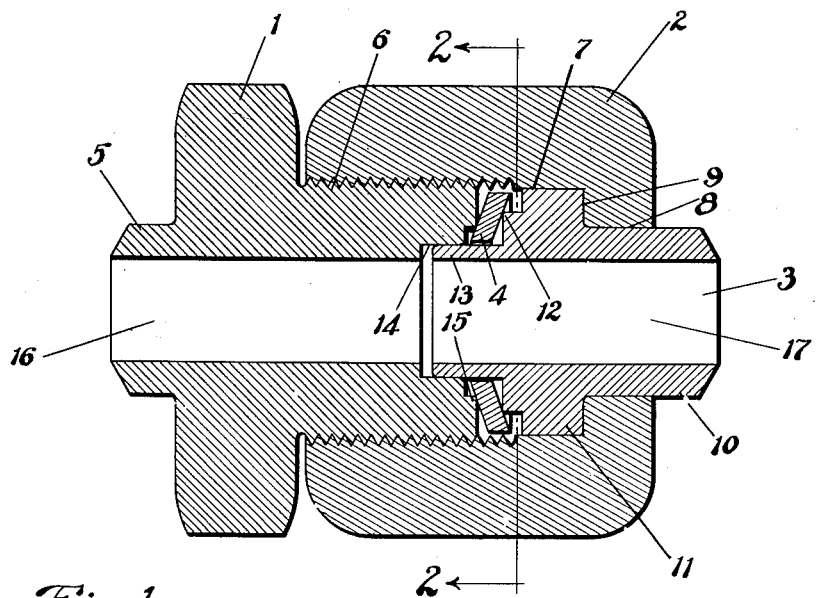
Figure 2:
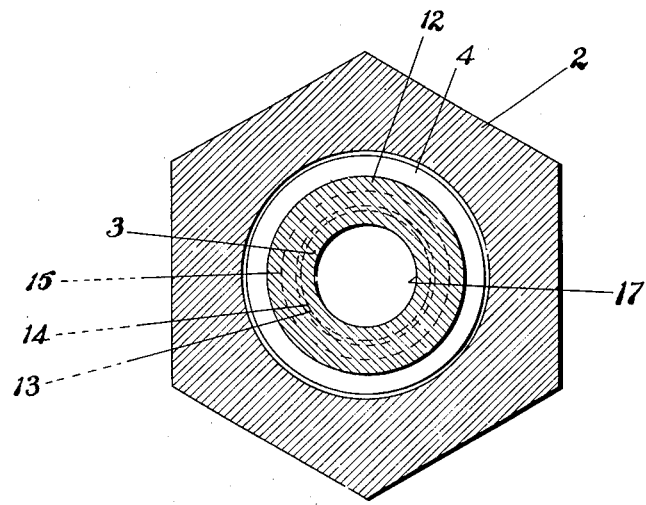

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal sectional view through my union with packing gland, and Fig. 2 is a sectional view through line 2—2 of Fig. 1.

Similar characters of reference refer to similar parts and portions throughout the different views of the drawings.

The union body 1, nut 2, flange member 3, and gland 4 constitute the principal parts and portions of my union.

The union body 1 is polygon shaped and is preferably of the same wrench size as nut 2. A boss 5 projects from one side of the body 1 for connection with the end of a tube, not shown. It will be here noted that the tube may be welded or secured to the members 3 and 5 as desired. From the opposite side of the body 1 projects another boss 6 which is externally threaded to enter the nut 2. The bore 7 of the nut 2 is not tapped its entire length, it being tapped only to a depth slightly deeper than the length of the boss 6, from which depth it is a smooth bore for a short distance. It is then reduced to a smaller bore 8, thus forming a shoulder 9.

The flange member 3 is a hollow cylinder, a portion 10 of which projects through the bore 8 of the nut 2. A portion of the cylinder of a greater diameter than the portion 10 forms the flange 11 which engages the shoulder 9 and the smooth bore 7. On the opposite side of the flange 11 from the portion 10 is a projecting corner portion 12 which is formed by reducing the periphery of the flange 11, this smaller diameter thus obtained being still further reduced. This last reduction of the cylinder also forms an extending tube portion 13 which enters a bore 14 near the end of the boss 6, the bore being enlarged at the end of the boss 6 and forming a projecting corner portion 15 thereon, this corner portion being of a smaller diameter than the corner portion 12 of the flange member 3. A bore 16 extends axially through the union body 1 and a similar bore 17 extends axially through the flange member 3.

The gland 4 is a spring steel washer which is conical shaped, the periphery remaining parallel with the axis and the surfaces laying parallel to each other, the conventional orifice being provided through its axis.

When it is desired to join two lengths of tubing, an end of one length of tubing is secured by welding, threads or other means to the boss 5 of the union body 1. The end of the other length of tubing is secured in the same manner to the projecting portion 10 of the flange member 3. The gland 4 is then placed around the portion 13. The nut 2, having been placed beforehand on the flange member 3, is then turned up on the threads of the boss 6, drawing the portion 13 into the bore 14 and pressing the corners 12 and 15 against the opposite surfaces of the gland 4 tending to flatten it. The torque of the gland 4 thus produced, effectually seals the union against leakage, the seals being at the point of contact of the corners 12 and 15 with the gland 4, thus providing a torque on the gland which changes with the temperature changes and withstands high pressure.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a union, a conical packing gland and mutually approachable members provided with different diameter concentric circular edges engaging the opposite sides of said conical packing gland, the inner and outer edges, forming respectively the bore and periphery of the gland, being free from engagement and permitted freely to expand and to be contracted radially and longitudinally.

2. In a union, a coupling member, a second coupling member having a sleeve portion fitting slidably within the first coupling member, a resilient packing washer positioned around but spaced from the sleeve and also free at its peripheral portion, said coupling members having at their adjacent sides different diameter concentric circular engaging portions adapted to engage the opposite lateral sides of the washer for forming a fluid tight joint between said coupling members, against the escape of fluid under pressure therebetween.

3. In a union, a pair of mutually approachable and connectible coupling members having at their adjacent sides different diameter concentric circular engaging portions, a resilient packing washer positioned between said circular engaging portions and engaged at its opposite lateral sides thereby, the inner and outer edges of the washer, forming respectively the bore and periphery thereof, being free from engagement, said washer being permitted freely to expand and to be contracted radially and longitudinally when clamped between said circular engaging portions, said washer, when clamped between said circular engaging portions, being distorted about said engaging portions and forming therewith a fluid-tight joint against the escape of fluid under pressure therebetween.

In testimony whereof, I have hereunto set my hand at Los Angeles, California, this 8th day of June, 1926.

RUSSELL R. WATERMAN.